United States Patent
Davidson et al.

(12) 
(10) Patent No.: US 6,675,458 B1
(45) Date of Patent: Jan. 13, 2004

(54) FIBER OPTIC CABLE STRIPPING AND MEASUREMENT APPARATUS

(75) Inventors: Bradley Davidson, Joppa, MD (US); Ali Reza Farjami, Ellicott City, MD (US); Reginald Barnes, Jefferson, MD (US)

(73) Assignee: Ciena Corporation, Linthicum, MD (US)

(*) Notice: Subject to any disclaimer, the term of this patent is extended or adjusted under 35 U.S.C. 154(b) by 18 days.

(21) Appl. No.: 10/003,863

(22) Filed: Nov. 2, 2001

(51) Int. Cl.⁷ ................................................. B23P 23/00
(52) U.S. Cl. ..................... 29/564.4; 29/33 M; 29/33 F; 29/407.01; 83/947; 30/90.1; 33/737
(58) Field of Search ............................. 29/564.4, 564.1, 29/33 M, 33 K, 33 Q, 33 S, 33 F, 407.01, 407.05, 866, 867, 868, 869; 83/947; 81/9.51; 30/90.1, 91.1; 33/734, 737, 751

(56) References Cited

U.S. PATENT DOCUMENTS

| | | | | |
|---|---|---|---|---|
| 2,929,136 A | * | 3/1960 | Andren | 29/33 F |
| 3,440,705 A | * | 4/1969 | Johnson | 29/407.01 |
| 4,400,882 A | * | 8/1983 | Thornton | 33/737 |
| 4,485,735 A | * | 12/1984 | Jonca | 101/93.21 |
| 5,065,527 A | * | 11/1991 | Shaw | 33/737 |
| 5,412,856 A | * | 5/1995 | Nazerian et al. | 29/33 M |
| 5,440,804 A | * | 8/1995 | Tamura | 81/9.51 |
| 6,079,297 A | * | 6/2000 | Chandler et al. | 81/9.51 |
| 6,327,767 B1 | * | 12/2001 | Puhakka et al. | 29/407.01 |
| 6,378,189 B1 | * | 4/2002 | McCreadie et al. | 29/407.01 |
| 2002/0100356 A1 | * | 8/2002 | Murakami et al. | 30/90.1 |

FOREIGN PATENT DOCUMENTS

DE 3335327 A1 * 4/1985

* cited by examiner

Primary Examiner—A. L. Wellington
Assistant Examiner—Erica Cadugan
(74) Attorney, Agent, or Firm—Michael Cammarata; James Olsen

(57) ABSTRACT

A fiber optic cable stripping and measuring apparatus that includes a mounting base having a template clamp connected thereto, the template clamp securing an optical component connected to the fiber optic cable. The apparatus further includes a fiber clamp connected to mounting base for securing a first portion of the fiber optic cable. A pair of fiber take up mandrels are provided adjacent to the fiber clamp for winding excess fiber optic cable, if excess cable is desired. The apparatus also includes a fiber stripper, spaced from take up mandrels, for scoring a buffer layer of the fiber optic cable. The fiber stripper enables the buffer layer of a portion of the fiber optic cable to be removed to expose optical fiber within the fiber optic cable. The apparatus further includes a cylindrical marking mandrel spaced from the fiber stripper and having a circumference that exceeds the minimum bend radius of the fiber optic cable. The cylindrical marking mandrel has a marking groove formed on its periphery so that the exposed optical fiber of the fiber optic cable may be marked at predetermined locations.

18 Claims, 3 Drawing Sheets

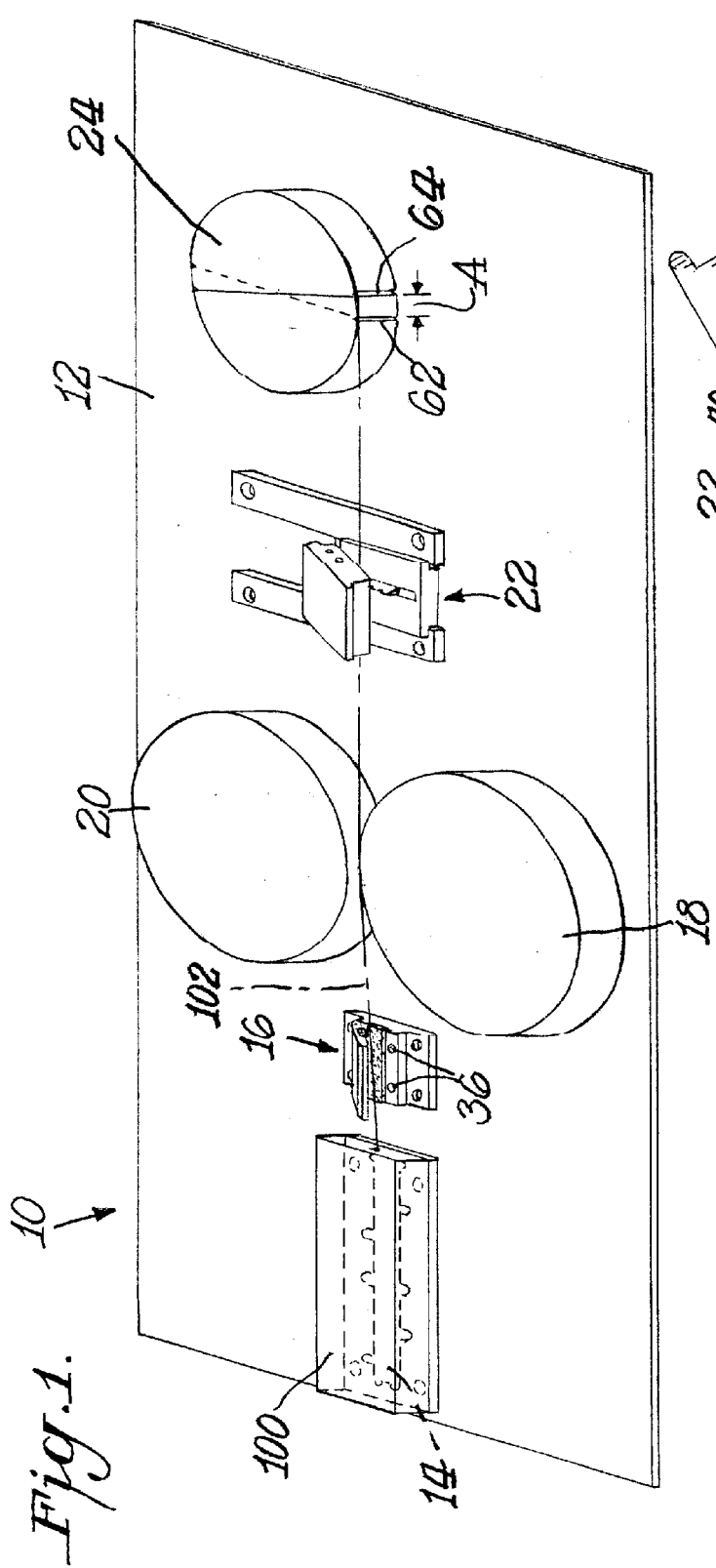
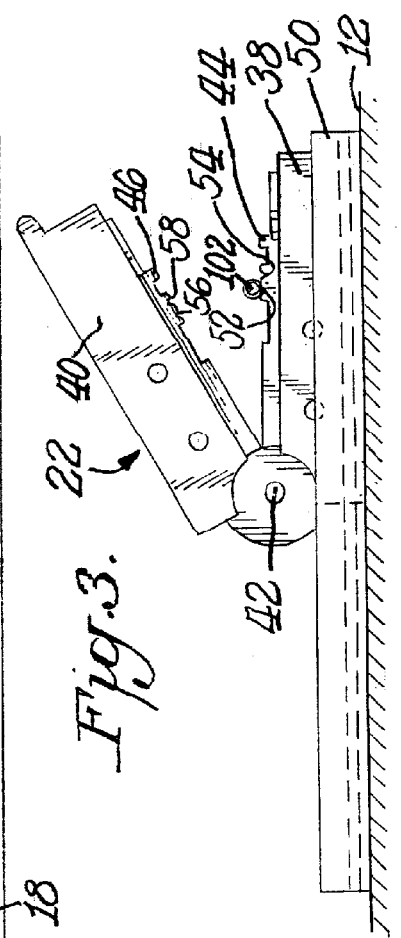
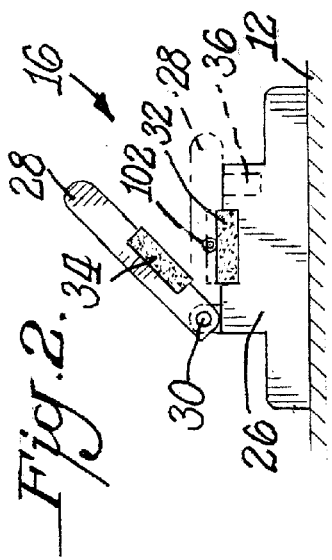

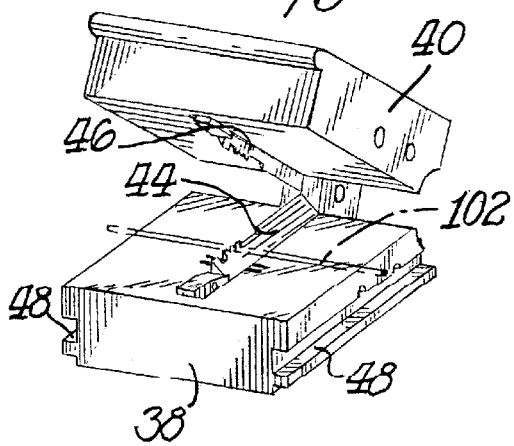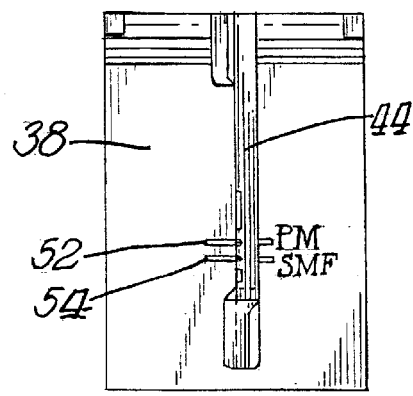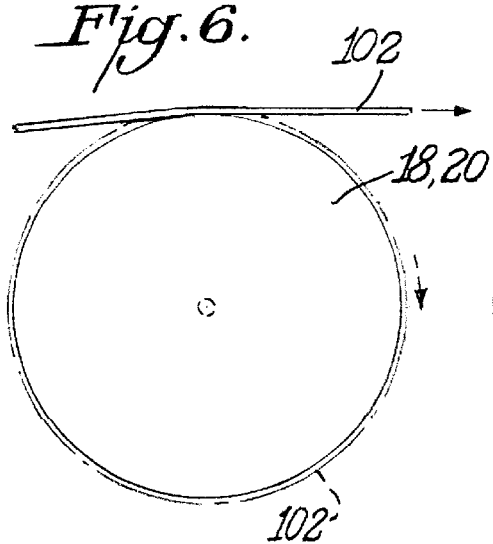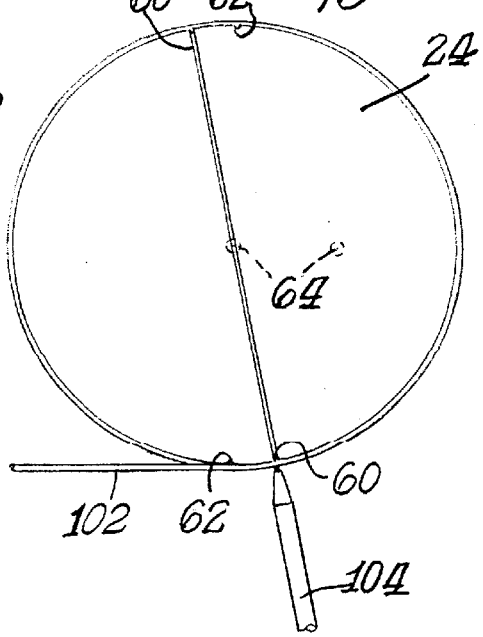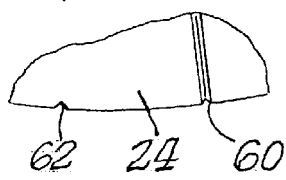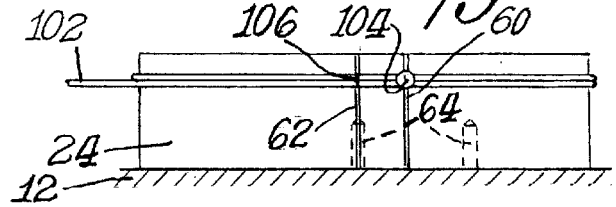

FIBER OPTIC CABLE STRIPPING AND MEASUREMENT APPARATUS

BACKGROUND OF THE INVENTION

A. Field of the Invention

The present invention relates generally to the communications field, and, more particularly to a fiber optic cable stripping and measuring assembly, and a method for stripping and measuring a fiber optic cable using the same.

B. Description of the Related Art

Along with the increasing prominence of the Internet has come the wide-ranging demand for increased communications capabilities, including more channels and greater bandwidth per channel. Optical media, such as fiber optic cables, promise an economical alternative to electrical conductors for high-bandwidth long-distance communications. As described in U.S. Pat. No. 6,079,297, assigned to the assignee of the present application, a typical fiber optic cable consists of a silica glass core region that provides a path for optical signals traveling along the cable. The core region is surrounded by a cladding region whose refractive index may be altered to achieve a desired propagation path of the optical signals traveling along the core region. The cladding region is in turn surrounded by an outer protective coating to protect the core region and the cladding region from damage, such as nicks, scratches or dents, which could degrade the long term quality and performance of the fiber optic cable. A fiber optic cable is also protected by a buffer layer that is typically a firm polymer which provides increased protection to the fiber while also increasing the fiber bending stiffness. The buffer layer is formed directly around the protective coating and there is usually a significant adhesive force between the buffer layer and the protective coating.

The glass optical fibers of fiber optic cables have very small diameters, which are susceptible to external influences such as mechanical stress and environmental conditions. The index of refraction of the core is higher than the index of refraction of the cladding to promote internal reflection of light propagating down the core.

Certain uses of fiber optic cables require that a portion of the buffer layer be removed from the fiber optic cable. For example, to make a fiber optic coupler, the buffer layers are stripped from portions of at least two fiber optic cables, and the stripped portions are fused (spliced) together in side-by-side relationship and stretched. It is important that the stripped portions of the fiber optic cables do not become weakened during the stripping process since weakened fiber optic cables can fail during subsequent process steps or during handling of the coupler when tensile stress is applied to the exposed glass optical fiber.

A buffer layer of a fiber optic cable may be removed or stripped in a variety of ways. Buffer layers can be mechanically stripped from an optical fiber by placing the fiber within a precision linear stripper as disclosed in U.S. Pat. No. 6,079,297, discussed above, bringing blades of the stripper into contact with opposite sides of the buffer layer, and then moving the tool relative to the axis of the buffer layer. The bare portion of the fiber usually needs to be wiped with a cloth wetted with alcohol or the like to remove smudges and/or particles of buffer layer that have been deposited on the bare portion of optical fiber by the buffer layer removal process. This type of buffer layer removal process has been built into equipment that performs the tasks of the technician, whereby the process may no be longer manual.

Fiber optic cables are prepared prior to splicing to another fiber optic cable, or joining to a terminating device, by cleaving the fiber to obtain a high-quality endface. In order to obtain low optical losses, the endface of the fiber must be substantially flat and without flaws. In addition to endface quality, one parameter of importance is the angle of the endface to the optical axis of the optical fiber. It is desirable that the plane of the endface be normal to the optical axis, with the fracture angle measuring deviation from the normal.

When the fiber optic cables of two optical components are to be joined or spliced, the end portions of the buffer layers of the fiber optic cables need to be removed. The end portions of the fiber optic cables also need to be cleaved to form endfaces. Typically, the endfaces are formed a predetermined distance from the optical components, by measuring the predetermined distance from the optical component. The endfaces of the cables may then be fusion spliced together. As used herein, the term "splice" refers to the assembly of a fused joint of fiber optic cables, and, generally, although not necessarily, a reinforcing bar and a protective sheath (also known as a splice protector).

The optical components may then be installed in an optical communications circuit. Typically, the fused fiber optic cables joining the two optical components are routed, bent, and/or stored in the optical communications circuit. The joined fiber optic cables may be wrapped around two storage mandrels, providing straight and bent portions of the joined fiber optic cables. Therefore, the splice joining the two cables is preferably formed at a portion of the cables that is not bent when they are routed, bent, or stored in the circuit. That is, the splice is preferably formed at straight portions of the joined fiber optic cables. When the splice of the joined fiber optic cables is located a straight portion, the splice is subjected to less mechanical stresses than would occur if it were formed at a bent portion.

Since there is typically excess fiber optic cable when the two optical components are spliced, the predetermined distance for forming the endfaces of the cables may occur at multiple points along the lengths of the fiber optic cables. This is fortunate since the cleaving and splicing of fiber optic cables is not always successful.

When the cleaving or splicing of fiber optic cables is unsuccessful, additional lengths of the fiber optic cable buffer layer may need to be removed, and predetermined distances from the optical components for the locations of the endfaces must be measured. The new predetermined distances preferably will occur at a portion of the cables that is not bent when they are routed, bent, or stored in the circuit. Currently, the measurement of the predetermined distances is manually performed by measuring, with a ruler, the distance from the optical components to the desired location of the endfaces. This measurement is cumbersome and time consuming.

Thus, there is a need in the art to easily strip the outer buffer layer of a fiber optic cable and measure predetermined points on the fiber optic cable that may be used as splice points.

SUMMARY OF THE INVENTION

The present invention solves the problems of the related art by providing an apparatus that strips the outer buffer layer of a fiber optic cable, and measures predetermined splice points on the stripped portion of the cable. The apparatus of the present invention may be used in a method for stripping and measuring a fiber optic cable.

In accordance with the purpose of the invention, as embodied and broadly described herein, the invention comprises a fiber optic cable stripping and measuring apparatus, comprising: a fiber clamp for securing a first portion of the fiber optic cable; a fiber stripper spaced from said fiber clamp for scoring a buffer layer of the fiber optic cable to enable the buffer layer of a portion of the fiber optic cable to be removed to expose an optical fiber within the fiber optic cable; and a marking mandrel spaced from said fiber stripper and having a circumference that exceeds the minimum bend radius of the fiber optic cable, said cylindrical marking mandrel having a marking groove formed on its periphery so that the exposed optical fiber of the fiber optic cable may be marked at a predetermined location.

Further in accordance with the purpose of the invention, as embodied and broadly described herein, the invention comprises a method for stripping and measuring a fiber optic cable with an apparatus having a fiber clamp, a marking mandrel having a circumference that exceeds the minimum bend radius of the fiber optic cable, and a fiber stripper interposed between and spaced from the fiber clamp and the marking mandrel, comprising: securing a first portion of the fiber optic cable with the fiber clamp; scoring a buffer layer of the fiber optic cable with the fiber stripper; removing a portion of the buffer layer of the fiber optic cable to expose an optical fiber within the fiber optic cable; wrapping the exposed optical fiber around the marking mandrel; and marking a predetermined location of the exposed optical fiber using a marking groove formed on the periphery of the marking mandrel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is perspective view of a fiber optic cable stripping and measuring apparatus in accordance with an embodiment of the present invention;

FIG. 2 is a side elevational view of a fiber clamp of the fiber optic cable stripping and measuring apparatus shown in FIG. 1;

FIG. 3 is a side elevational view of a fiber stripper of the fiber optic cable stripping and measuring apparatus shown in FIG. 1;

FIG. 4 is a perspective view of the fiber stripper shown in FIG. 3;

FIG. 5 is a top plan view of a base portion of the fiber stripper shown in FIGS. 3 and 4;

FIG. 6 is a top plan view of a fiber take up mandrel of the fiber optic cable stripping and measuring apparatus shown in FIG. 1;

FIG. 7 is a top plan view of a marking mandrel of the fiber optic cable stripping and measuring apparatus shown in FIG. 1;

FIG. 8 is a front elevational view of the marking mandrel shown in FIG. 7;

FIG. 9 is an enlarged fragmental view showing locator grooves of the marking mandrel shown in FIGS. 7 and 8, wherein the locator grooves are for marking the fiber optic cable splice locations.

DETAILED DESCRIPTION OF EMBODIMENTS OF THE INVENTION

Figure 10:
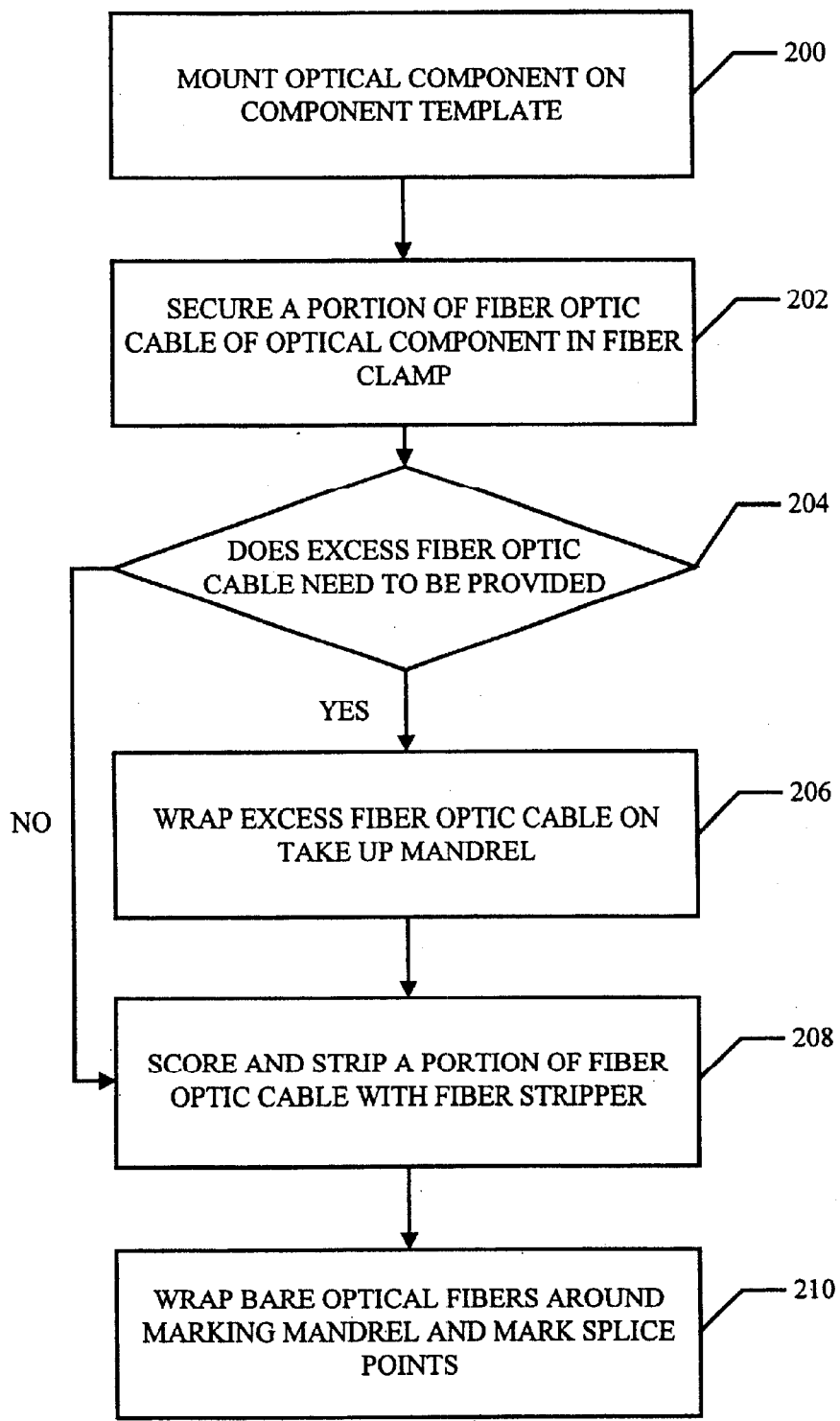
FIG. 10 is a flow chart showing a method for stripping and measuring a fiber optic cable using the fiber optic cable stripping and measuring apparatus shown in FIG. 1.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Referring now specifically to the drawings, a fiber optic cable stripping and measuring apparatus according to the present invention is illustrated in FIG. 1, and shown generally as reference numeral 10. The stripping and measuring apparatus 10 includes a mounting base 12 that supports a component template clamp 14, a fiber clamp 16, a pair of fiber take up mandrels 18, 20, a fiber stripper 22, and a marking mandrel 24. Mounting base 12 may be provided on a workbench or other similar work station, and may have a plurality of feet that support base 12. Mounting base 12 may be made from a variety of materials, but preferably is made from stainless steel, and more preferably from an anodized aluminum.

Component template clamp 14 is configured to receive and hold an optical component, such as optical component 100 shown in FIG. 1. The configuration of component template clamp 14 will vary depending upon the optical component being retained clamp 14. The optical components capable of being used with the present invention include, but are not limited to, optical emitters (e.g., light-emitting diodes, laser diodes, etc.), and optical detectors (e.g., PIN photodiodes, avalanche photodiodes, etc.). By way of example only, the clamp 14 shown in FIG. 1 is configured to receive and retain a laser diode. Although only a single component template clamp 14 is shown in FIG. 1, a plurality of clamps 14 may be provided on mounting base 12. Clamp 14 may connect to mounting base 12 via various connection mechanisms. For example, clamp 14 may connect to mounting base 12 with an adhesive, glue, double-sided tape, screws, nuts and bolts, etc.

Alternatively, the present invention may work with a fiber optic cable that is not emanating from an optical component. In such a scenario, there would be no optical component 100, and clamp 14 would not be required. Rather, a portion of the fiber optic cable would be retained in fiber clamp 16, and the remaining fiber optic cable would be provided to fiber take up mandrels 18, 20 (if necessary), fiber stripper 22, and marking mandrel 24.

As shown in FIGS. 1 and 2, fiber clamp 16 includes a base portion 26 pivotally connected to a top plate portion 28 via a pivot 30. Base portion 26 has a resilient, preferably rubber, pad 32 connected at its top surface. Resilient pad 32 aligns with a resilient (also preferably rubber) pad 34 connected to a bottom surface of top plate portion 28. FIG. 2 shows fiber clamp 16 in an open position (and closed position in phantom) so that a fiber optic cable 102 connected to (or optically communicating with) optical component 100 may be received and retained between resilient pads 32, 34. Base portion 26 may be made from or contain a magnetic material. Top plate portion 28 may be made of a metallic material or a magnetic material having a polarity opposite of the polarity of magnetic base portion 26. Alternatively, as shown in FIGS. 1 and 2, base portion 26 may have magnetic pins 36 formed therein, and top plate portion 28 may be made of a metallic material. When fiber clamp 16 is closed, the magnetic force created between magnetic pins 36 and metallic top plate portion 28 holds fiber clamp 16 closed, and securely compresses fiber optic cable 102 between resilient pads 32, 34. Resilient pads 32, 34 prevent fiber optic cable 102 from slipping, but also prevent the compression forces from damaging cable 102.

Fiber take up mandrels 18, 20 are provided in case excess fiber optic cable is desired for the optical component 100. Fiber take up mandrels 18, 20 may both be cylindrical-shaped, however, mandrels have different diameters, and hence circumferences, to accommodate different excess cable lengths. Other shapes of mandrels 18, 20 are possible, including but not limited to elliptical, oval, etc.

The circumferences of take up mandrels 18, 20 will vary depending upon the optical component 100, where optical component 100 is to be mounted in a circuit, the fiber optic cable 102 (if no component 100), the intended path of the stripped fiber optic cable 102 within the optical circuit, and generally where along the fiber 102 the straight and bent portions will occur. Preferably, mandrels 18 have circumferences approximately in the range often (10) to one-hundred and fifty (150) centimeters. By way of example only and as shown in the Figures, mandrel 18 may have a circumference of eighty (80) centimeters, and mandrel 20 may have a circumference of seventy-eight (78) centimeters. It is to be understood that these diameters are application specific and depend upon the factors mentioned above.

Preferably, the circumferences of mandrels 18, 20 prevent the optical fibers of cables wrapped around mandrels 18, 20 from being bent beyond the minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

Mandrels 18, 20 may be integrally formed with mounting base 12. Preferably mandrels 18, 20 easily connect and disconnect to and from base 12 so that fiber take up mandrels having different circumferences can be easily utilized with apparatus 10. Thus, mandrels 18, 20 may connect to base 12 with screws, nuts and bolts, double-sided tape, pins, etc. Mandrels 18, 20 may be made from a variety of materials, but preferable are made from stainless steel, and more preferable, an anodized aluminum. FIG. 6 shows how fiber optic cable 102 may be wrapped around mandrels 18, 20. Although the cable 102 is shown being wrapped in a clockwise direction, it may also be wrapped in a counter-clockwise direction.

As shown in FIGS. 3–5, fiber stripper 22 includes a base portion 38 pivotally connected to a top portion 40 via a pivot 42. Base portion 38 has a stripper blade 44 connected at its top surface that aligns with another stripper blade 46 connected to a bottom surface of top portion 40. FIG. 2 shows fiber stripper 22 in an open position so that fiber optic cable 102 may be received between stripper blades 44, 46. Base portion 38 of fiber stripper 22 may connect to mounting base 12 with a variety of connection mechanisms, including screws, nuts and bolts, adhesive, glue, rivets, etc. For example, as shown in FIGS. 3 and 4, base portion 38 may have slots 48 formed in its side surfaces that are received in guide rails 50 connected to mounting base 12. In this configuration guide rails 50 may be connected with a variety of connection mechanisms, including screws, nuts and bolts, adhesive, glue, rivets, etc.

As best shown in FIG. 3, stripper blade 44 has a pair of V-notches 52, 54 that align with a pair of V-notches 56, 58 formed in stripper blade 46. Preferably, V-notches 52, 56 have the same size and accommodate a certain size fiber optic cable, and V-notches 54, 58 have the same size and accommodate a different size fiber optic cable. For example, V-notches 52, 56 receive polarization maintaining (PM) fiber optic cables, and V-notches 56, 58 receive single mode (SMF) fiber optic cables. Although the V-notches may be sized to accommodate a variety of fiber optic cables, depending upon the optical component, the fiber optic cable, and the buffer layer of the fiber optic cable used with apparatus 10. Many fiber optic cables have loosely wound buffer layers, making the cable thicker), and many fiber optic cables have tightly wound buffer layers, making the cable thinner. Thus, two pairs of V-notches have been provided, but the present invention is not limited to this number of V-notches.

When fiber stripper 22 is closed, the fiber optic cable 102 is squeezed between the V-notches, and provides a score (or cut) on the buffer layer of fiber optic cable 102. While holding the fiber stripper 22 closed, or upon removal from fiber stripper 22, an operator may remove the buffer layer of fiber optic cable 102 from the score mark to the end of cable 102 by gripping (either manually or with a hand-held fiber stripper) the cable buffer layer and pulling it towards the end of cable 102. The buffer layer of cable 102 will then break at the score mark and slide towards the end of cable 102, exposing the bare optical fiber of cable 102 from the score mark to the end of cable 102.

Once fiber optic cable 102 is stripped, it then needs to be marked for splice points. Thus, the bare optical fiber of cable 102 is wrapped around marking mandrel 24, either clockwise or counter-clockwise, as shown in FIG. 7. Marking mandrel 24 maybe cylindrical-shaped and may have different diameters, and hence circumferences, to accommodate different fiber optic cable types. Other shapes of mandrel 24 are possible, including but not limited to elliptical, oval, etc.

The circumference of marking mandrel 24 will vary depending upon the optical component 100, where optical component 100 is to be mounted in a circuit, the fiber optic cable 102 (if no component 100), the intended path of the stripped fiber optic cable 102 within the optical circuit, and generally where along the fiber 102 the straight and bent portions will occur.

Preferably, marking mandrel 24 has a circumference approximately in the range of ten (10) to one-hundred and fifty (150) centimeters. By way of example only and as shown in the Figures, marking mandrel 24 may have a circumference of thirty (30) centimeters. Preferably, the circumference of mandrel 24 is large enough to prevent the optical fibers of cables wrapped around mandrel 24 from being bent beyond the minimum bend radius to operate within required performance specifications.

As shown in FIGS. 1 and 7–9, marking mandrel 24 has a multitude of marking grooves 60, 62 located on its side surface that enable an operator to mark multiple, precise splice points on the bare optical fiber of cable 102. Grooves 60, 62 may be placed at a variety of locations around the circumference of marking mandrel 24, the locations being dependent upon the optical component 100 being used and the application of the optical component 100, the intended path of the stripped fiber optic cable 102 within the optical circuit, and generally where along the fiber 102 the straight and bent portions will occur. The marking grooves preferably correspond to the point(s) along the fiber 102 where the fiber will be substantially straight or otherwise to avoid bent portions such that the fiber 102 can be cleaved and a splice formed at the straight portions relative to the intended placement of the fiber 102 in a circuit or module.

Furthermore, more than two grooves may be provided around the circumference of marking mandrel 24 to accommodate a variety of optical components and fiber optic cables. The number and location of grooves will depend upon the factors mentioned above so as to locate splice points where the fiber 102 will be relatively straight when installed in a circuit, module, etc. For example, a marking mandrel 24 may have a first pair of diametrically-opposed grooves 60, and a second pair of diametrically-opposed grooves 62 that are spaced a distance A of two (2) centimeters from grooves 60, as shown in FIG. 1. Thus, marking mandrel 24 shown in FIG. 1 accommodates two different types of optical components or intended fiber placements.

Once fiber optic cable 102 is wrapped around marking mandrel 24, an operator may mark cable 102 with a marking device 104, such as for example, a pen, marker, etc. The number of marks 106 on cable 102 will depend upon the number of times cable 102 is wrapped around mandrel 24, and whether cable 102 is marked at multiple grooves 60, 62.

Marking mandrel 24 may be integrally formed with mounting base 12, but preferably connects to and disconnects from base 12 so that marking mandrels having different circumferences can be easily utilized with apparatus 10. Thus, marking mandrel 24 may connect to base 12 with screws, nuts and bolts, double-sided tape, pins, etc., or as shown in FIG. 8, with a pair of pins 64 that extend from base 12 and into marking mandrel 24. Marking mandrel 24 may be made from a variety of materials, but preferable is made from stainless steel, and more preferable, an anodized aluminum.

Although the method of stripping and measuring fiber optic cable 102 has been described above with reference to apparatus 10, a step-by-step description of the method will be described with reference to FIG. 10. The method begins at step 200, where the operator mounts optical component 100 on template clamp 14. The operator, at step 202, then secures fiber optic cable 102 emanating from optical component 100 within fiber clamp 16, and then decides, at step 204, whether excess fiber optic cable 102 needs to be wrapped around take up mandrel 18, 20. If excess cable is to be wrapped, then the method proceeds to step 206 where the operator wraps the excess cable around take up mandrel 18, 20. After step 206, or after skipping step 206, the method proceeds to step 208 where the operator scores and strips the buffer layer from cable 102 with fiber stripper 22. Finally, at step 210, the operator wraps the bare optical fiber of cable 102 around marking mandrel 24 and marks splice points on cable 102.

The optical component 100 and its marked and stripped cable 102 may then be removed from apparatus 10 by removing optical component 100 from template clamp 14 and cable 102 from fiber clamp 16. The marked fiber optic cable 102 may subsequently be cleaved at one of the marks and spliced to another fiber optic cable. If the cleave or splice of the marked cable 102 fails, the operator may easily cleave cable 102 at the next mark on cable 102 and attempt the splicing operation again. Using apparatus 10 of the present invention, eliminates the need to measure predetermined splice marks with a ruler, and enables multiple, evenly-spaced splice marks to be made with the stroke of a pen.

It will be apparent to those skilled in the art that various modifications and variations can be made in the fiber optic cable stripping and measuring apparatus and method of the present invention and in construction of the apparatus and method without departing from the scope or spirit of the invention. As an example, the material selections and dimensions discussed above are purely exemplary and not limiting of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fiber optic cable stripping and measuring apparatus, comprising:
    a fiber clamp for securing a first portion of the fiber optic cable;
    a fiber stripper spaced from said fiber clamp for scoring a buffer layer of the fiber optic cable to enable the buffer layer of a portion of the fiber optic cable to be removed to expose an optical fiber within the fiber optic cable; and
    a marking mandrel spaced from said fiber stripper and having a circumference that exceeds the minimum bend radius of the fiber optic cable, said marking mandrel having a marking groove formed on its periphery so that the exposed optical fiber of the fiber optic cable is marked at a predetermined location.

2. A fiber optic cable stripping and measuring apparatus as recited in claim 1, wherein the exposed optical fiber of the fiber optic cable may be marked at a plurality of predetermined locations.

3. A fiber optic cable stripping and measuring apparatus as recited in claim 1, wherein said marking mandrel is cylindrical.

4. A fiber optic cable stripping and measuring apparatus as recited in claim 3, wherein said marking mandrel has a circumference of approximately ten to one-hundred and fifty centimeters.

5. A fiber optic cable stripping and measuring apparatus as recited in claim 1, further comprising:
   a component template clamp for receiving and retaining an optical component connected to the fiber optic cable.

6. A fiber optic cable stripping and measuring apparatus as recited in claim 5, wherein the optical component is selected from the group consisting of a light-emitting diode, a laser diode, a PIN photodiode, and an avalanche photodiode.

7. A fiber optic cable stripping and measuring apparatus as recited in claim 1, further comprising:
   a take up mandrel interposed between said fiber clamp and said fiber stripper and having a circumference that exceeds the minimum bend radius of the fiber optic cable, wherein excess lengths of the fiber optic cable are wound around the circumference of said take up mandrel.

8. A fiber optic cable stripping and measuring apparatus as recited in claim 7, wherein said take up mandrel is cylindrical and has a circumference of approximately ten to one-hundred and fifty centimeters.

9. A fiber optic cable stripping and measuring apparatus as recited in claim 1, further comprising:
   a first take up mandrel interposed between said fiber clamp and said fiber stripper and having a circumference that exceeds the minimum bend radius of the fiber optic cable, wherein excess lengths of the fiber optic cable may be wound around the circumference of said first take up mandrel; and
   a second take up mandrel interposed between said fiber clamp and said fiber stripper and having a circumference that exceeds the minimum bend radius of the fiber optic cable, wherein excess lengths of the fiber optic cable may be wound around the circumference of said second take up mandrel.

10. A fiber optic cable stripping and measuring apparatus as recited in claim 9, wherein said second take up mandrel is cylindrical and has a circumference of approximately ten to one-hundred and fifty centimeters.

11. A fiber optic cable stripping and measuring apparatus as recited in claim 9, wherein said first take up mandrel is cylindrical and has a circumference of approximately ten to one-hundred and fifty centimeters.

12. A fiber optic cable stripping and measuring apparatus as recited in claim 1, wherein said fiber stripper includes a base portion pivotally connected to a top portion, the top and bottom portions each having a stripper blade connected thereto, each stripper blade having a notch that aligns with a corresponding notch on the other stripper blade, and the notches of the stripper blade scoring a portion of the buffer layer of the fiber optic cable to enable the buffer layer of a portion of the fiber optic cable to be removed to expose an optical fiber within the fiber optic cable.

13. A fiber optic cable stripping and measuring apparatus as recited in claim 1, wherein said marking mandrel has a pair of diametrically-opposed marking grooves.

14. A fiber optic cable stripping and measuring apparatus as recited in claim 1, wherein said marking mandrel has a plurality of diametrically-opposed marking grooves.

15. A fiber optic cable stripping and measuring apparatus as recited in claim 1, wherein said fiber clamp includes a base portion pivotally connected to a top plate portion, the base portion having a resilient pad and a magnetic pin disposed therein, the top plate portion having a resilient pad that aligns with the resilient pad of the base portion, and the magnetic force created by the magnetic pin retaining the top plate portion on the base portion and compressing the fiber optic cable between the resilient pads.

16. A method for stripping and measuring a fiber optic cable with an apparatus having a fiber clamp, a marking mandrel having a circumference that exceeds the minimum bend radius of the fiber optic cable, and a fiber stripper interposed between and spaced from the fiber clamp and the marking mandrel, comprising:
   securing a first portion of the fiber optic cable with the fiber clamp;
   scoring a buffer layer of the fiber optic cable with the fiber stripper;
   removing a portion of the buffer layer of the fiber optic cable to expose an optical fiber within the fiber optic cable;
   wrapping the exposed optical fiber around the marking mandrel; and
   marking a predetermined location of the exposed optical fiber using a marking groove formed on the periphery of the marking mandrel.

17. A method for stripping and measuring a fiber optic cable as recited in claim 16, further comprising:
   mounting an optical component connected to the fiber optic cable on a template clamp spaced from the fiber clamp.

18. A method for stripping and measuring a fiber optic cable as recited in claim 16, further comprising:
   when excess fiber optic cable needs to be provided, prior to scoring the buffer layer of the fiber optic cable, wrapping excess fiber optic cable around a circumference of a take up mandrel interposed between the fiber clamp and the fiber stripper and having a circumference that exceeds the minimum bend radius of the fiber optic cable.

* * * * *